United States Patent [19]

Fukuta et al.

[11] Patent Number: 5,031,663
[45] Date of Patent: Jul. 16, 1991

[54] PRESSURE CONTROL VALVE DEVICE

[75] Inventors: Masahiro Fukuta; Osamu Komazawa, both of Nagoya; Tsukasa Watanabe, Toyota; Hiroyuki Ikemoto; Toshio Onuma, both of Susono; Shinji Matsuda, Toyota; Kunihito Sato, Susono, all of Japan

[73] Assignees: Aisin Seiki Kabushiki Kaisha, Kariya; Toyota Jidosha Kabushiki Kaisha, Toyota, both of Japan

[21] Appl. No.: 503,362

[22] Filed: Apr. 3, 1990

[30] Foreign Application Priority Data

Apr. 4, 1989 [JP] Japan .................................. 1-85288
Sep. 29, 1989 [JP] Japan .................................. 1-254222

[51] Int. Cl.$^5$ ............................................. F15B 13/043
[52] U.S. Cl. ............................. 137/625.64; 137/625.3; 137/625.61; 137/625.69
[58] Field of Search ........... 137/625.3, 625.61, 625.64, 137/625.65, 625.69

[56] References Cited

U.S. PATENT DOCUMENTS

| 3,556,155 | 1/1971 | McWilliams et al. | 137/625.3 X |
| 4,155,535 | 5/1979 | Seamone | 137/625.3 X |
| 4,245,816 | 1/1981 | Johnson | 137/625.3 X |
| 4,527,592 | 7/1985 | Dotti et al. | 137/625.61 |
| 4,590,968 | 5/1986 | Wolfges | 137/625.64 |

FOREIGN PATENT DOCUMENTS

| 61-2983 | 1/1986 | Japan | 137/625.65 |
| 63-106133 | 5/1988 | Japan . | |
| 1-122717 | 5/1989 | Japan . | |
| 2102158 | 1/1983 | United Kingdom | 137/625.64 |

Primary Examiner—Gerald A. Michalsky
Attorney, Agent, or Firm—Burns, Doane, Swecker & Mathis

[57] ABSTRACT

A pressure control valve delivers a pressure which is proportional to a current level chosen to energize a solenoid therein to a shock absorber of a suspension. A spool in the valve has an annular groove for communicating an output port to a high pressure port or a low pressure port selectively. There are conical surfaces or inclined surfaces at edges of lands adjacent to the groove, which incline from annular surfaces of the lands toward the bottom of the groove. The inclined surfaces slow down a change of the flow rate from the high pressure port to the output port and from the output port to the low pressure port when the annular groove communicates with the high pressure port and the low pressure port respectively.

2 Claims, 10 Drawing Sheets

PRESSURE AT OUTPUT PORT 84
TIME →

PRESSURE AT OUTPUT PORT 84
TIME →

PRESSURE CONTROL VALVE DEVICE

FIELD OF THE INVENTION

The invention relates to a pressure control valve, in particular, to a valve having a spool which is urged toward a first position communicating an output port with a low pressure port by a pressure applied to an end of the spool from the output port and toward a second position communicating the output port with a high pressure port by a force determined by an electric driver and applied to an opposite end of the spool. The spool assumes a position where the pressure at the output port is balanced with the force applied by the electric driver.

BACKGROUND OF THE INVENTION

One of typical devices as described above is so called a proportional pressure control valve or a linear solenoid valve in which a solenoid device is employed as an electric driver. The linear solenoid valve delivers a pressure at an output port. The pressure is substantially proportional to a current level of the solenoid device. The linear solenoid valve is applied to deliver a predetermined fluid pressure which is proportional to a level of an electric signal to a fluid circuit element or a fluid responsive device, for example, a shock absorber of a vehicular suspension.

For example, Japanese Laid-Open Patent Application No. 106,133/1988 discloses a pressure control system in which a turning pattern of a vehicle is determined on the basis of a steering angle and a steering angular velocity, and is utilized to modify a constant of proportionality or gain which is to be applied to a corrected suspension pressure which is determined in proportion to a lateral acceleration prevailing on the vehicle, and a pressure control valve for supplying the corrected suspension pressure to a suspension. The pressure control valve has a high pressure port communicated with a high pressure piping, a low pressure port communicated with a return piping to a reservoir, an output port which supplies the corrected pressure to the suspension, a spool which is driven in a direction by a pressure applied from the output port to an end of the spool to decrease a flow rate from the high pressure port to the output port while to increase a flow rate from the output port to the low pressure port and a solenoid for driving the spool in an opposite direction through a coiled spring to increase the flow rate from the high pressure port to the output port while to decrease the flow rate from the output port to the low pressure port. The spool assumes a position where the pressure at the output port is balanced with a driving force which depends on a current level used to energize the solenoid. Thus a pressure corresponding to the current level appears at the output port and is applied to a shock absorber of a suspension.

Japanese Laid-Open Patent Application No. 122717/1989 discloses a pressure control valve having a target pressure space and a needle valve for determining a pressure in the space between the spool and a plunger of the solenoid. The current level which energizes the solenoid determines the pressure in the target pressure space which in turn applied to the spool.

The spool of the pressure control valve has an annular groove 91 communicating with an output port 84 at a center portion of the spool 90 as shown in FIG. 10a. The spool 90 assumes a position where a force $F_O$ applied to a left end of the spool 90 by a pressure transmitted from an output port 84 is balanced with a force $F_i$ applied to a right end of the spool 90 by the solenoid or the pressure in the target pressure space. Because, when $F_O$ exceeds $F_i$, the spool 90 is driven to the right, allowing the groove 91 to communicate with a low pressure port 85, thus causing the pressure of the output port 84 to decrease, which in turn decreases $F_O$. While when $F_O$ decreases under $F_i$, the spool 90 is driven to the left, allowing the groove 91 to communicate with a high pressure port 82, thus causing the pressure of the output port 84 to increase, which in turn increases $F_O$. With the movements of the spool 90 as described, the pressure of the output port 84 is determined to that is substantially proportional to $F_i$ which is controlled with the current level of the solenoid.

Various sensors detect a height of a car body, a longitudinal acceleration and a lateral acceleration prevailing on the vehicle, a steering angular velocity and so on. An electronic controller detects or presumes a change of an attitude of the car body for calculating a pressure correction value. The controller adjusts the current level of the solenoid for correcting or compensating the change of the attitude of the car body. In this manner, when a dive or roll of the car body is presumed, the controller increases the pressure of one or more suspensions which may shrink by the dive or roll while decreases the pressure of remaining one or more suspensions which may extend by the dive or roll, for preventing an actual occurrence of the dive or roll of the car body. The other electronic controller determining a target height of the car body responding to a vehicle speed detected or an input operation of a vehicle driver, calculates a pressure correction value. The electronic controller adjusts the current level of the solenoid for compensating the pressure correction value.

Assuming that the current level of the solenoid is changed as a sine curve, the pressure at the output port 84 changes as shown in FIG. 10b. The pressure curve shown in FIG. 10b includes sharp fluctuations (higher harmonics). Also acute fluctuations of the pressure at the output port 84 occurs when the current level is maintained constant and the spool 90 moves to the right or left due to an acute rise or fall of the pressure at the output port 84 when a wheel of the vehicle suddenly rises or falls. The sharp or acute fluctuations of the pressure at the output port 84 may apply pressure impulses to a fluid circuit and the shock absorber of a suspension which are connected to the output port 84 of the pressure control valve. The pressure impulses may cause noises or vibrations and may degrade an endurance of the fluid circuit.

SUMMARY OF THE INVENTION

It is an object of the invention to restrain the pressure impulses.

The object mentioned above can be accomplished in accordance with the invention by providing a pressure control valve device comprising, a spool support member (81) having a high pressure port (82), an output port (84) and a low pressure port (85), all of which are arranged in this order along a longitudinal axis of the spool support member (81); a spool (90) supported with the spool support member (81) for a movement along the longitudinal axis, having a fluid communication groove (91) which always communicates with the output port (84) and a width of which along the longitudinal axis is wider than a distance from the output port (84) to the high pressure port (82) and a distance from the output port (84) to the low pressure port (85), and being driven by a pressure applied to an end of the spool (90) from the output port (84) to decrease a flow rate from the high pressure port (82) to the output port (84) through the groove (91) while to increase a flow rate from the output port (84) to the low pressure port (85) through the groove (91); an actuator means (95a, 95b) for driving the spool (90) in a first direction to increase the flow rate from the high pressure port (82) to the output port (84) while to decrease the flow rate from the output port (84) to the low pressure port (85); an electrical driver (96 to 99) for driving the actuator means (95a, 95b) in the first direction; and inclined surfaces (91a; $91ds_{1,2}$, $91hs_{1,2}$, $91dr_{1,2}$, $91hr_{1,2}$) of lands of the spool (90) adjacent the groove (91), the inclined surfaces are inclined from annular surfaces of the lands toward a bottom of the groove (91) to slow down a change of the flow rate from the high pressure port (82) to the output port (84) due to a movement of the spool (90) in a second direction opposite to the first direction by the pressure from the output port (84) and a change of the flow rate from the output port (84) to the low pressure port (85) due to a movement of the spool (90) in the first direction.

According to a first embodiment of the invention, the spool (90) has conical surfaces (91a) at both ends of an annular groove (91), the conical surfaces slant from annular outer surfaces of lands adjacent the groove (91) of the spool (90) toward the bottom of the groove (91) with an angle under a right angle with respect to the longitudinal axis of the spool (90).

According to a second embodiment of the invention, the spool (90) has a plurality of inclined fluid passes ($91ds_{1,2}/91hs_{1,2}$; $91dr_{1,2}/91hr_{1,2}$) at the edges of the lands adjacent to an annular groove (91), the fluid passes incline from an annular outer surfaces of the lands to the bottom of the groove (91) and have different length along a longitudinal axis direction (A).

It is to be understood that the reference characters indicated in parentheses indicate references or numerals appearing in the drawings to be described later in embodiments to be described below.

With the arrangement according to the invention, a force in the first direction is applied to the actuator means (95a, 95b) with the electrical driver (96 to 99). The force drives the spool (90) to increase the flow rate from the high pressure port (82) to the output port (84) while to decrease the flow rate from the output port (84) to the low pressure port (85). Namely, a force to increase the pressure at the output port (84) is applied to the spool (90) with the electrical driver. Whereas the pressure of the output port (84) is applied to the spool (90) to drive the spool (90) in the second direction opposite to the first direction of the force generated by the electrical driver (96 to 99), to decrease the flow rate from the high pressure port (82) to the output port (84) while to increase the flow rate from the output port (84) to the low pressure port (85). Thus, the spool (90) assumes a position at which the pressure at the output port (84) balances with the force applied by the electrical driver (96 to 99). The pressure at the output port (84) will change responding to a change of electric energization of the electrical driver (96 to 99).

When a pressure of a device, for example, a shock absorber of a suspension, which is applied with the pressure at the output port (84) becomes higher by a rapid throw up of a wheel of a vehicle, the higher pressure is applied to the spool (90) through the output port (84) to drive the spool (90) in the second direction to decrease the pressure at the output port (84). Namely, the higher pressure is drawn to the low pressure port (85) through the pressure control valve device (80fr). When the pressure of the shock absorber becomes lower by a rapid fall down of the wheel, the lower pressure reduces the pressure at the output port (84) to move the spool (90) in the first direction to increase the pressure at the output port (84). Namely, a higher pressure is supplied out from the output port (84) of the pressure control valve (80fr) to the shock absorber. In this manner, the pressure of the shock absorber connected to the output port (84) of the pressure control valve device (80fr) is maintained in a substantially constant value which is determined by the current level of the electrical driver (96 to 99).

When the spool (90) moves in the first mentioned direction to increase the pressure at the output port (84), the fluid communication groove (91) at first communicates with the high pressure port (82) through small spaces on the inclined surfaces (91a; $91ds_{1,2}$, $91hs_{1,2}$, $91dr_{1,2}$, $91hr_{1,2}$) at the edges of lands of the spool (90). The inclined surfaces (91a; $91ds_{1,2}$, $91hs_{1,2}$, $91dr_{1,2}$, $91hr_{1,2}$) moves in the first mentioned direction to increase the communication between the output port (84) and the high pressure port (82) by degrees or gradually. Thus the pressure at the output port (84) increases gradually with respect to the movement of the spool (90). This gradual increasement of the pressure at the output port (84) has no pressure impulse as described in relation to the prior arts. The pressure control valve device (80fr) of the invention provides smooth change of the pressure at the output port (84) as shown in FIG. 8 in which the higher harmonics (sharp fluctuations) as in FIG. 10b are not appeared. Thus noises due to cavitations which may be caused from the sharp fluctuations will not be caused on the pressure control valve device (80fr) of the invention.

According to the second embodiment (FIG. 9a) of the invention, since the spool (90) has a plurality of inclined fluid passes ($91ds_{1,2}/91hs_{1,2}$; $91dr_{1,2}/91hr_{1,2}$) having different length along the longitudinal axis direction (A) and inclining at the edges of the lands adjacent to annular groove (91), at a first stage the output port (84) communicates with the high pressure port (82) through the longer passes ($91ds_{1,2}$) and thereafter at a second stage through the longer passes ($91ds_{1,2}$) and the remaining shorter passes ($91dr_{1,2}$) when the spool (90) moves in the first mentioned direction. At the first stage, a communication rate between the output port (84) and the high pressure port (82) is determined by an inclination degree of the longer passes ($91ds_{1,2}$) At the second stage, the communication rate increases due to an additional communication through the shorter passes ($91dr_{1,2}$). The communication rate at the second stage is determined by the inclination degree of the longer passes ($91ds_{1,2}$) and an inclination degree of the shorter passes ($91dr_{1,2}$). Therefore, according to the second embodiment of the invention, the communication rate may be adjusted with the figure, length and inclination of each of the passes ($91ds_{1,2}/91hs_{1,2}$; $91dr_{1,2}/91hr_{1,2}$) for obtaining desired smoothing of the pressure at the output port (84).

Other objects and features of the invention will become apparent from the following description of embodiments thereof with reference to the drawings.

BRIEF DESCRIPTION OF THE DRAWINGS

FIG. 2 is a longitudinal section, to an enlarged scale, of a suspension 100fr shown in FIG. 1a;

FIG. 3 is a longitudinal section, to an enlarged scale, of a pressure control valve 80fr of the first embodiment shown in FIG. 1a;

FIG. 4 is a longitudinal section, to an enlarged scale, of a cut valve 70fr shown in FIG. 1a;

FIG. 5 is a longitudinal section, to an enlarged scale, of a relief valve 60fr shown in FIG. 1a;

FIG. 6 is a longitudinal section, to an enlarged scale, of a main check valve 50 shown in FIG. 1a;

FIG. 9b is a sectional view taken along line IX-B—IXB in FIG. 9a;

FIG. 9c is a graph showing a cross sectional area of a communication pass between an output port 84 and a low pressure port 85 or a high pressure port 82 shown in FIG. 9a;

FIG. 10b is a graph showing a pressure change at an output port 84 of the pressure control valve shown in FIG. 10a.

DESCRIPTION OF PREFERRED EMBODIMENTS

A FIRST EMBODIMENT

Figure 1A:
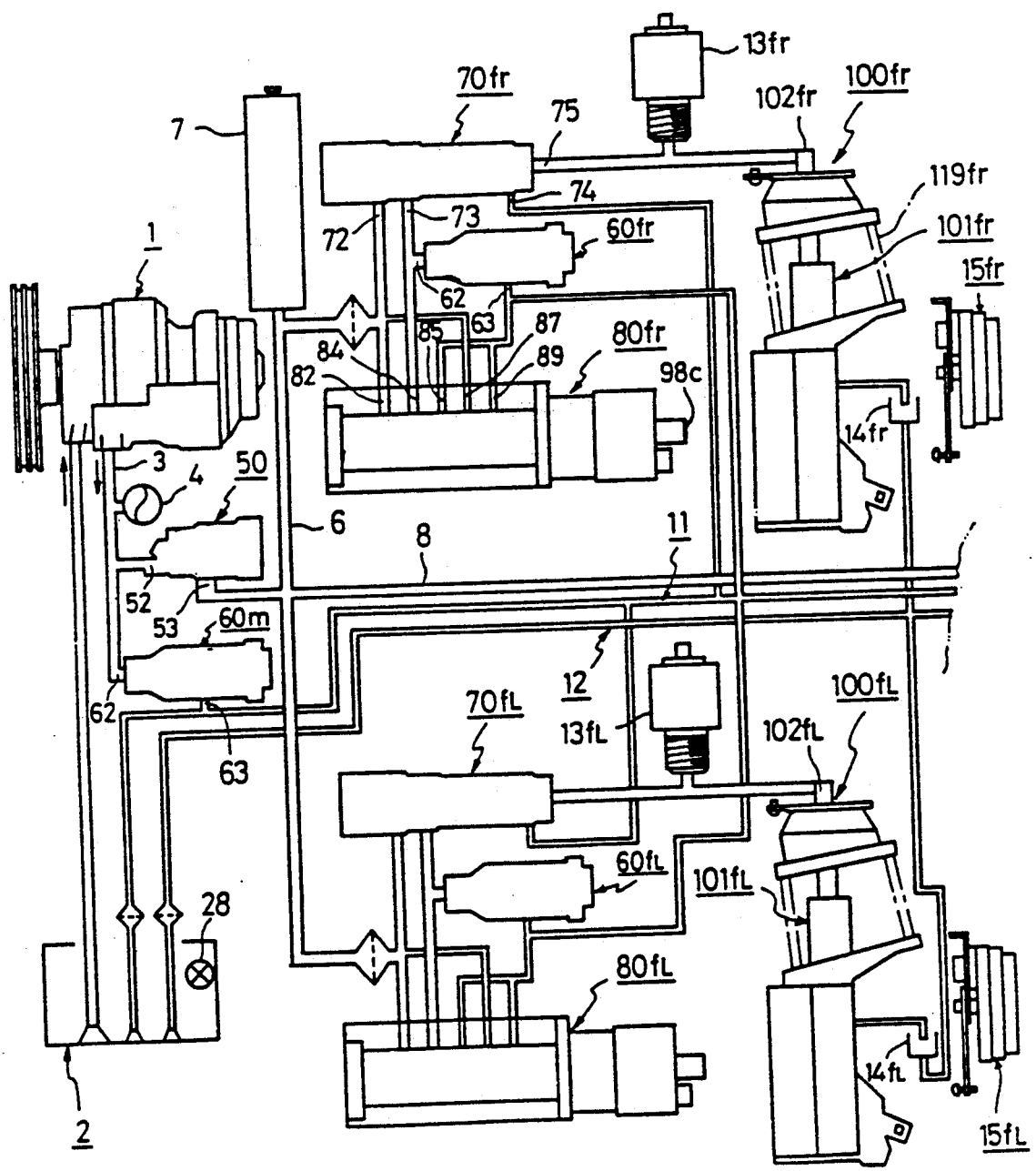
FIGS. 1a and 1b are block diagrams of a suspension pressure feeding system comprising a first embodiment of the invention, each Figure representing one of halves of a single system.
Figure 1B:
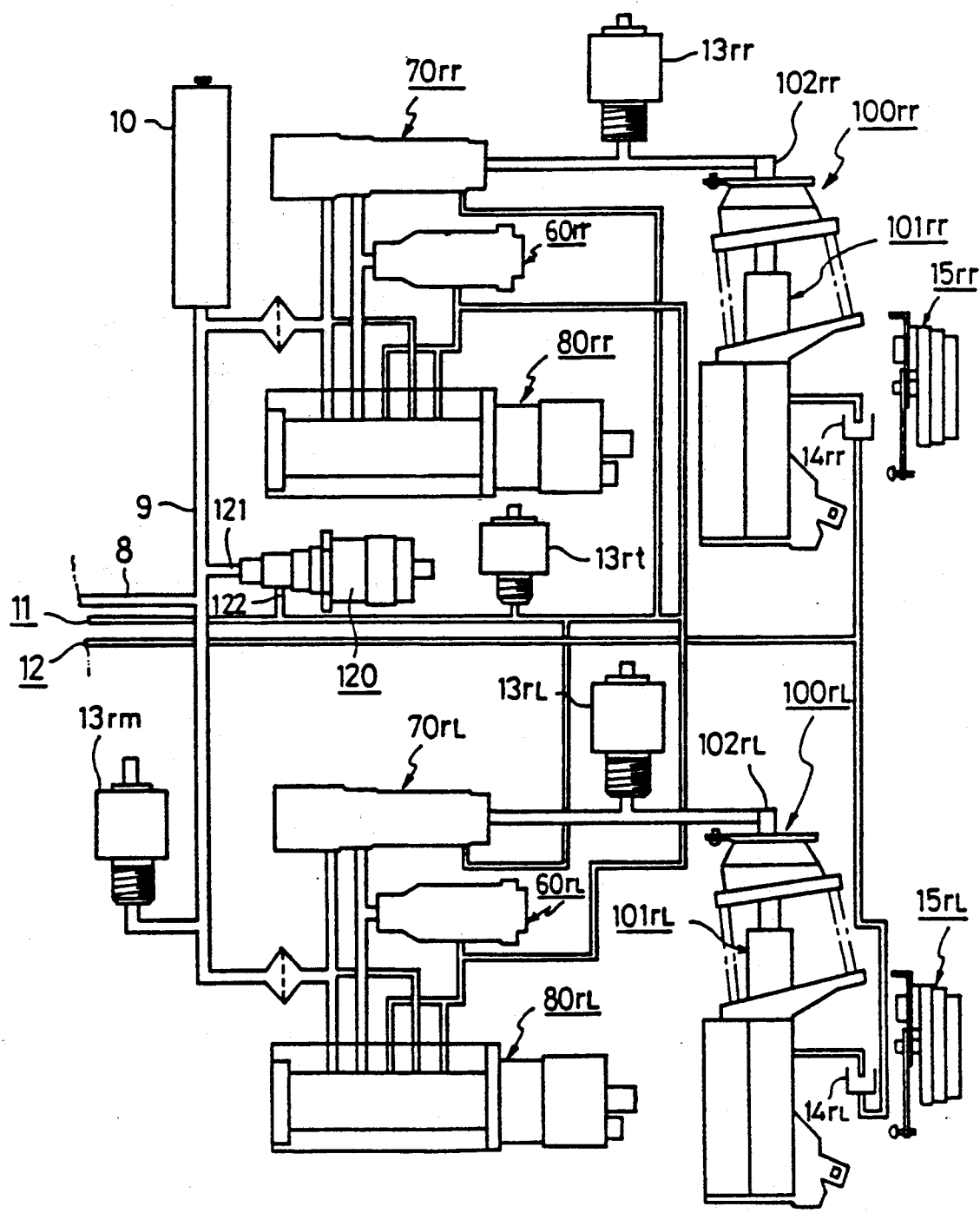

FIGS. 1a and 1b show a mechanical arrangement of an apparatus which supports a carrosserie or car body. An oil pressure pump 1, which is of radial type, is disposed within an engine room, and is driven for rotation by an onboard engine, not shown, thus drawing an oil from a reservoir 2 and discharging a given flow rate of oil to a high pressure port 3 at a rotational speed equal to or greater than a given value.

High pressure port 3 of the radial pump is connected to an accumulator 4 which serves suppressing pulsations, to a main check valve 50 and to a relief valve 60m. A high pressure oil from the port 3 is fed to a high pressure piping 8 through the valve 50. The check valve 50 blocks a reverse flow of the oil from the piping 8 to the port 3 whenever the port 3 assumes a lower pressure than the piping 8. The relief valve 60m drains the port 3 to a reservoir return piping 11, which represents one of return oil paths to the reservoir 2, when the pressure of the port 3 assumes a greater than a given value, thus maintaining the pressure of the port 3 substantially at a given pressure.

The high pressure feed piping 8 communicates with a front wheel high pressure feed piping 6 which feeds a high pressure to front wheel suspensions 100fL, 100fr, and a rear wheel high pressure feed piping 9 which feeds high pressure to rear wheel suspensions 100rL, 100rr. The piping 6 communicates with an accumulator 7 for the front wheels while the piping 9 communicates with an accumulator 10 for the rear wheels.

The piping 6 is also connected to a pressure control valve 80fr through an oil filter, and the valve 80fr is effective to regulate or reduce the pressure from the piping 6, which will be hereafter referred to as a front wheel line pressure, to a required pressure before supplying it to a cut valve 70fr and a relief valve 60fr. The required pressure is substantially proportional to a current level which is used to energize an electrical coil of the valve 80fr and represents a suspension sustain pressure.

When the pressure of the piping 6 or the front wheel line pressure is below a given value, the cut valve 70fr interrupts a communication between the output port 84 (to the suspension) of the pressure control valve 80fr and a hollow piston rod 102fr associated with a shock absorber 101fr of the suspension 100fr, thus preventing the pressure of the piston rod 102fr from being released to the pressure control valve 80fr. When the front rear line pressure remains at or above the given value, the cut valve 70fr allows the output pressure from the pressure control valve 80fr to be directly fed to the piston rod 102fr.

The relief valve 60fr restricts the internal pressure of the shock absorber 101fr at or below an upper limit. Specifically, when the suspension sustain pressure from the output port 84 of the pressure control valve 80fr exceeds a given high pressure, the output port 84 is drained to the reservoir return path or piping 11, thus maintaining the output port of the valve 80fr substantially at or below the given high pressure. The relief valve 60fr is also effective to provide a buffering action upon the transmission to the pressure control valve 80fr of any shocking rise in the internal pressure of the shock absorber 101fr, as when a front, right wheel of the vehicle strikes against a bump on the road. In response to such rise, the internal pressure of the shock absorber 101fr is drained to the reservoir return path 11 through the piston rod 100fr and the cut valve.

The suspension 100fr essentially comprises the shock absorber 101fr and a coiled suspension spring 119fr, and operates to maintain a car body at an elevation relative to the front, right wheel, which corresponds to the pressure supplied to the shock absorber 101fr from the output port 84 of the pressure control valve 80fr through the piston rod 102fr, or a pressure which is regulated by the pressure control valve 80fr or the suspension sustain pressure.

The sustain pressure fed to the shock absorber 101fr is detected by a pressure sensor 13fr, which produces an analog signal representing a detected sustain pressure. A vehicle elevation sensor 15fr is mounted on the car body adjacent to the suspension 100fr, and includes a rotor connected to a link which is coupled to the front, right wheel. In this manner, the sensor 15fr produces a digital data representing the elevation of a car body with respect to the front, right wheel.

In a similar manner, a suspension 100fL associated with a front, left wheel is equipped with a pressure control valve 80fL, a cut valve 70fL, a relief valve 60fL, a vehicle elevation sensor 50fL, and a pressure sensor 13fL. The pressure control valve 80fL is connected to the front wheel high pressure feed piping 6, thus feeding a required pressure to the piston rod 102fL of the shock absorber 101fL of the suspension 100fL.

Furthermore, a suspension 100rr associated with a rear, right wheel is equipped with a pressure control valve 80rr, a cut valve 70rr, a relief valve 60rr, a vehicle elevation sensor 15rr and a pressure sensor 13rr. The valve 80rr is connected to the rear wheel high pressure feed piping 9, feeding a required pressure to the piston rod 102rr of a shock absorber 101rr of the suspension 100rr.

Finally, a suspension 100rL associated with a rear, left wheel is equipped with a pressure control valve 80rL, a cut valve 70rL, a relief valve 60rL, a vehicle elevation sensor 15rL and a pressure sensor 13rL. The pressure control valve 80rL is connected to the rear wheel high pressure feed piping 9, feeding a required pressure to the piston rod 102rL of a shock absorber 101rL of the suspension 100rL.

In this embodiment, an engine is mounted on the front wheel side, and accordingly the pump 1 is also mounted on the front wheel side or in the engine room, whereby the length of pipings from the pump 1 to the rear wheel suspensions 100rr, 100rL is greater than the length of pipings from the pump 1 to the front wheel suspensions 100fr, 100fL. Accordingly, a pressure drop caused by the piping path is greater for the rear wheels, and if an oil leakage occurs in the piping, the pressure drop will be greatest for the rear wheels. Accordingly, a line pressure detecting sensor 13rm is connected to the rear wheel pressure feed piping 9. On the other hand, the pressure of the reservoir return path 11 will be lowest at its end located nearer the reservoir 2, and will tend to increase in a direction away from the reservoir 2. Accordingly, the pressure of the reservoir return path 11 is also detected by a pressure sensor 13rr which is located toward the rear wheel.

The piping 9 is connected to a bypass valve 120, which is effective to regulate a pressure in the high pressure feed piping 8 to a value which corresponds to a current level used to energize an electrical coil of the valve 120, thus obtaining a required line pressure. When an ignition switch is opened to stop the operation of the engine and hence the pump 1, the line pressure is reduced substantially to zero or drained through the reservoir return path 11 to the atmospheric pressure which prevails in the reservoir 2, thus reducing the loading upon the engine or pump when restarting. The reduction in the line pressure turns the cut valves 70fr, 70fL, 70rr, 70rL off, thus preventing a pressure release from the shock absorbers.

Figure 2:
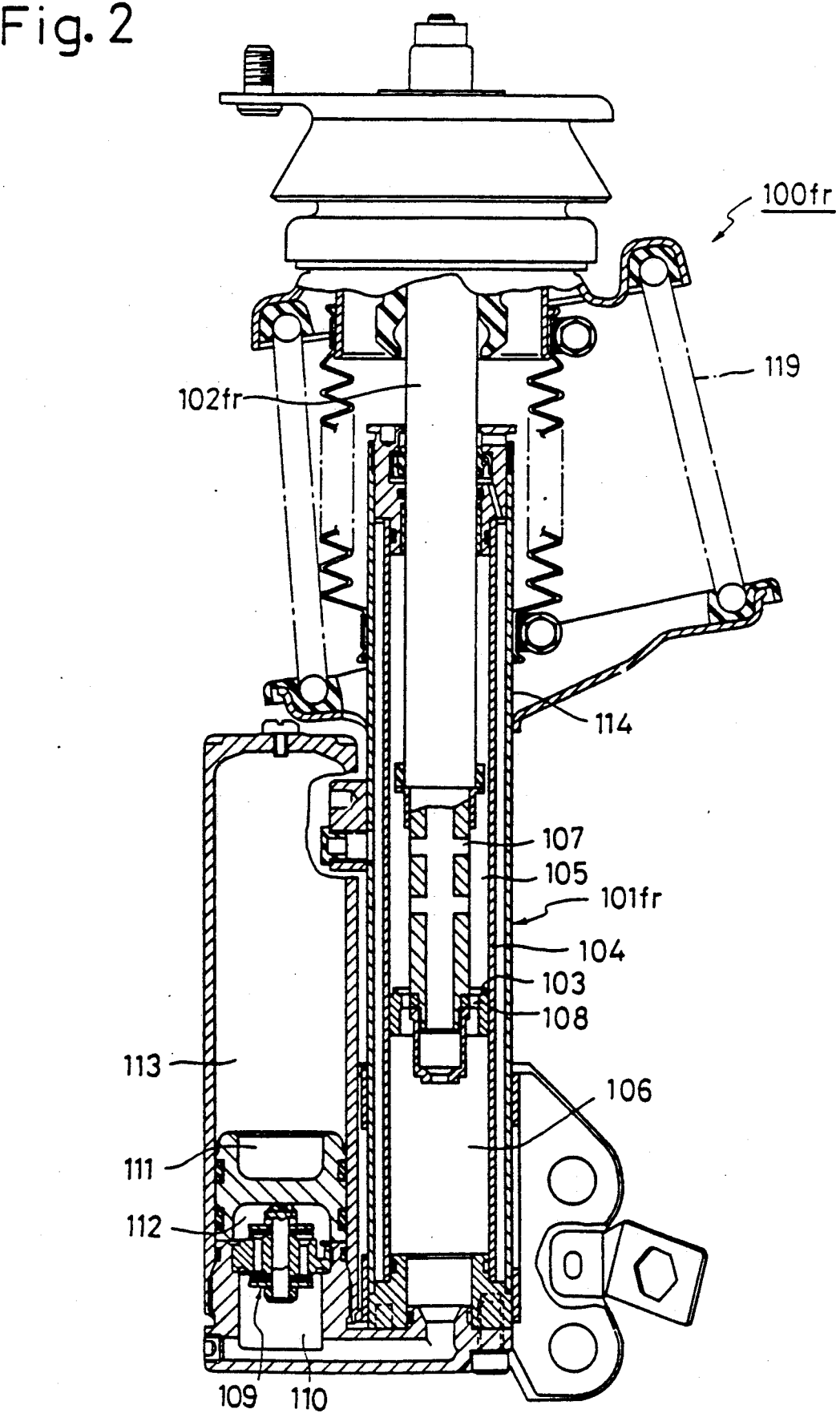

FIG. 2 shows a longitudinal section, to an enlarged scale, of the suspension 100fr. A piston 103 is fixedly mounted on the piston rod 102fr of the shock absorber 101fr, and extends through an inner sleeve 104 to divide its interior into an upper chamber 105 and a lower chamber 106. An oil pump pressure which represents the suspension sustain pressure is fed to the piston rod 102fr from the output port of the cut valve 70fr, which pressure is passed through a side opening 107 in the piston rod 102fr to be applied to the upper chamber 105 disposed inside the inner sleeve 104, and thence passed through a vertical through-opening 108 formed in the piston rod 103 to be applied to lower chamber 106. A sustain pressure which is proportional to the product of the pressure applied to the lower chamber 106 and cross-sectional area (the square of the rod radius multiplied by $\pi$) of the piston rod 102fr is applied to the piston rod 102fr.

The lower chamber 106 communicates with a lower space 110 in an attenuator valve unit 109, which has an upper space that is divided by a piston 111 into a lower chamber 112 and an upper chamber 113. An oil from the lower space 110 passes through the valve unit 109 into the lower chamber 112 while a high pressure gas is confined in the upper chamber 113.

If the piston rod 102fr plunges rapidly downward into the inner sleeve 104 as a result of a bumping reaction of the front, right wheel, the internal pressure of the inner sleeve 104 increases rapidly, and similarly, the pressure in the lower space 110 tends to increase above the pressure in the lower pressure 112 rapidly. At this time, oil flows from the lower space 110 into the lower chamber 112 through a check valve which permits a flow of the oil from the lower space 110 to the lower chamber 112 above a given pressure differential across the valve unit 109, but which blocks a passage of the oil in the opposite direction, whereby the piston 111 moves up, thus buffering the transmission of upward impact applied from the wheel to the piston rod 102fr. In this manner, the transmission of bumping effect of the wheel to the car body is buffered.

If the piston rod 102fr tends to be withdrawn upwardly from within the inner sleeve 104 as the front, right wheel goes down rapidly, the internal pressure of the inner sleeve 104 reduces rapidly, again causing the pressure of the lower space 110 to be rapidly reduced below the pressure of the lower chamber 112. At this time, oil flows from the lower chamber 112 to the lower space 110 through a check valve which permits a flow of the oil from the lower chamber 112 to the lower space 110 above a given pressure differential across the valve unit 109, but which blocks a passage of the oil in the opposite direction, whereby the piston 111 moves down, buffering the transmission of downward impact applied from the wheel to the piston rod 102fr. In this manner, the transmission of impact applied to the wheel or falling effect to the car body is buffered.

As the pressure applied to the shock absorber 101fr increases in order to increase the vehicle elevation, the pressure in the lower chamber 112 rises, which in turn causes the piston 111 to be raised, allowing the latter to assume a position which corresponds to a loading upon the car body.

When there is no vertical movement of the piston rod 102fr relative to the inner sleeve 104 as during a parking condition, a seal between the inner sleeve 104 and the piston rod 102fr prevents any substantial oil leakage from the inner sleeve 104 to an outer sleeve 114. However, it is desirable that such seal exhibits a sealing characteristic which permits a very limited amount of oil leakage during the vertical movement of the piston rod 102fr in order to reduce a resistance presented to such movement of the rod 102fr. Any oil leaking to the outer sleeve 114 is returned to the reservoir 2 through a drain 14fr (FIG. 1a) which is open to the atmosphere and a drain return piping 12 (FIG. 1a), which represents a second return path. The reservoir 2 is equipped with a level sensor 28 (FIG. 1a), which produces an oil shortage signal when the oil level within the reservoir 2 is below a lower limit.

It should be understood that other suspensions 100fL, 100rr and 100rL are constructed in substantially the same manner as the suspension 100fr mentioned above.

Figure 3:
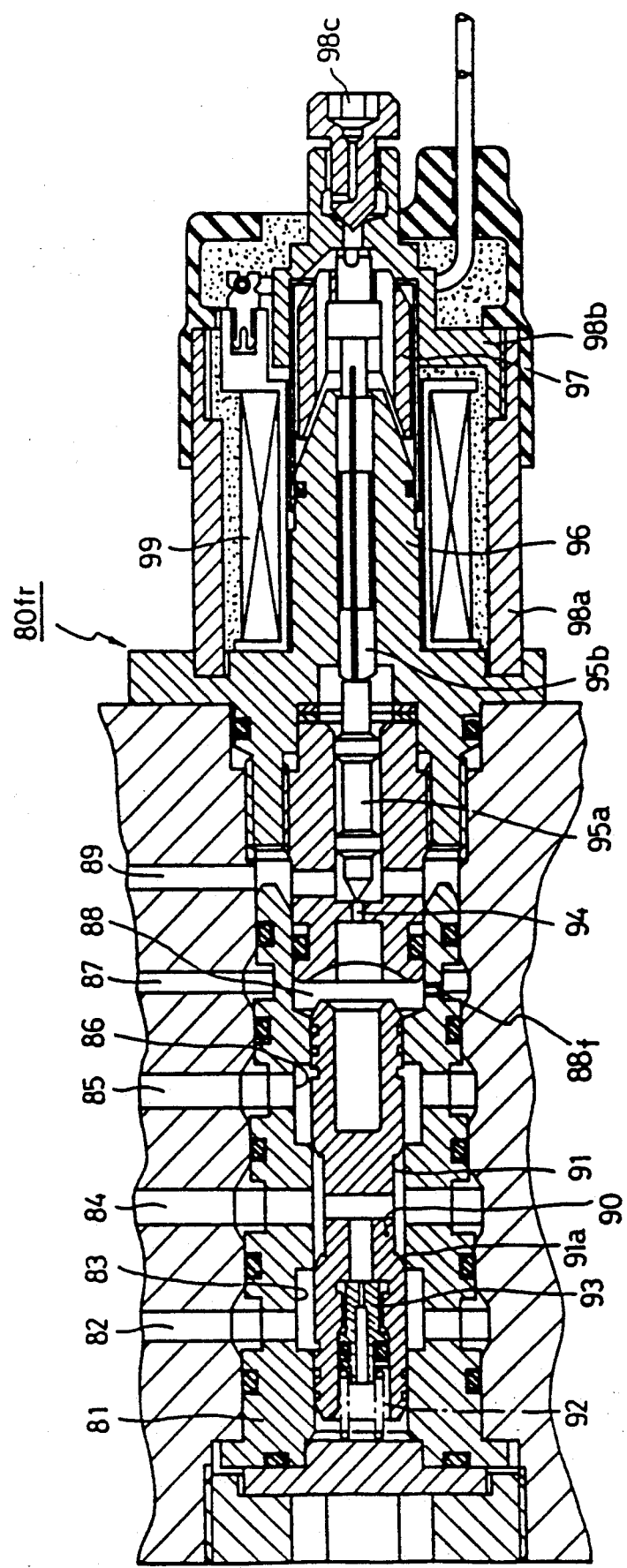

FIG. 3 shows a longitudinal section, to an enlarged scale, of the pressure control valve 80fr. It includes a sleeve 81, which is centrally formed with a spool receiving opening, the inner surface of which is formed with an annular groove 83 communicating with a line pressure port 82 and another annular groove 86 communicating with a low pressure port 85. An output port 84 opens into the sleeve at a location intermediate the both annular grooves 83, 86. A spool 90 is inserted into the spool receiving opening, and intermediate its length, its peripheral surface is formed with an annular groove 91 having a width which corresponds to the distance between a right edge of the groove 83 and a left edge of the groove 86. The left end of the spool 90 is formed with a valve receiving opening, which communicates with the groove 91, and into which a valve element 93 is inserted and held in place by a coiled compression spring 92. The valve element 93 is centrally formed with an orifice extending therethrough, which provides a communication between the space in which the groove 91 and hence the output port 84 is located and the space in which the valve element 93 and the spring 92 are received. Accordingly, at its left end, the spool 90 is subject to a pressure from the output port 84 or a regulated pressure which is applied to the suspension 100fr, whereby it is urged to the right. In the event a pressure from the output port 84 increases in an impulse manner, the valve element 93 is driven to the left against the resilience of the spring 92, creating a buffering space to the right of the valve element 93. Accordingly, when the pressure from the output port 94 rises in an impulse manner, such pressure rise is not immediately applied to the left end face of the spool 90, and thus the valve element 93 provides a buffering action upon a movement of the spool 90 to the right in response to an impulse-like pressure rise, or pressure surge from the output port 84. Conversely, it also exerts a buffering action upon a movement of the spool 90 to the left in response to an impulse-like pressure fall from the output port 84.

The right end face of the spool 90 is subject to a pressure from a target pressure space 88 communicating with a high pressure port 87, which pressure is supplied through an orifice 88f, whereby the spool 90 is urged to the left. A line pressure is fed to the high pressure port 87 while the target pressure space 88 communicates with a low pressure port 89 through a channel 94, the channel opening of which is determined by a needle valve 95. When the needle valve 95 closes the channel 94, the target pressure space 88 which communicates with the high pressure port 87 through the orifice 88f assumes the line pressure of the port 87, whereby the spool 90 is driven to the left, allowing the groove 91 in the spool 90 to communicate with the groove 83 or the line pressure port 82, thus causing the pressure of the port 91 or output port 84 to rise which is then transmitted to the left of the valve element 93, thus imparting a rightward driving force to the left end of the spool 90. When the needle valve 95 is located to leave the channel 94 fully open, the pressure from the space 88 will be substantially reduced below the line pressure from the high pressure port 87 because of the restriction presented by the orifice 88f. Accordingly the spool 90 moves to the right, allowing the groove 91 in the spool 90 to communicate with the groove 86 or the low pressure port 85, reducing the pressure in the port 91 or the output port 84. Such pressure is transmitted to the left of the valve element 93, thus reducing the rightward driving force which is applied to the left end of the spool 90. In this manner, the spool 90 assumes a position where the pressure from the target pressure space 80 is balanced with the pressure from the output port 84. Stated differently, a pressure which is substantially proportional to the pressure from the target pressure space 88 appears at the output port 84.

The pressure in the target pressure space 88 is determined by the position of the needle valve 95, which is in turn substantially in inverse proportion to the distance of the needle valve 95 from the channel 94, and hence there appears at the output port 84 a pressure which is substantially inversely proportional to the distance of the needle valve 95.

A stationary core 96 of magnetizable material is shaped to allow the needle valve 95 to extend therethrough, and has a right end which is in the form of truncated cone, which is opposed by a conical end face of a plunger 97, also formed of a magnetizable material, which defines an opening having a closed bottom. The needle valve 95 is secured to the plunger 97. The core 96 and the plunger 97 extend into a bobbin which carries an electrical coil 99 thereon.

When the coil 99 is energized, there is established a loop for a magnetic flux comprising the core 96, a yoke of magnetizable material 98a, an end plate of a magnetizable material 98b and the plunger 97 and then back to the core 96. The plunger 97 is attracted toward the core 96 and thus moves to the left, bringing the needle valve 95 closer to the channel 94 or reducing the distance mentioned above. It will be noted that the left end of the needle valve 95 is subject to a pressure from the target pressure space 88 which acts to drive it to the right while the right end of the needle valve 95 is subject to the atmospheric pressure through a low pressure port 98c which is open to the atmosphere, so that the needle valve 95 will be driven to the right by the pressure from the target pressure space 88 with a force which depends on the magnitude of such pressure (it will be noted that this corresponds to the position of the needle valve 95). As a consequence, the needle valve 95 is spaced from the channel 94 by a distance which is virtually inversely proportional to the current level which is used to energize the coil 99. One of the core and the plunger is shaped as a truncated cone while the other is shaped as a complementary conical opening in order to achieve a linear relationship between the current level and distance. As a consequence of such arrangement, there appears an output at the output port 84 which is substantially proportional to the current level used to energize the coil 99. The pressure control valve 80fr delivers a pressure at the output port 84 which is proportional to the current level within a given range.

Figure 8:
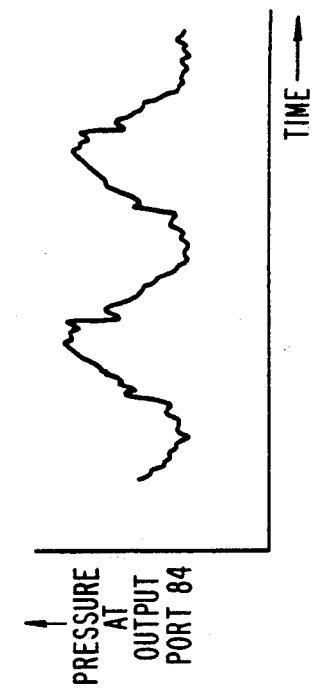
FIG. 8 is a graph showing a pressure change at an output port 84 of the pressure control valve 80fr shown in FIG. 3.
Figure 10B:
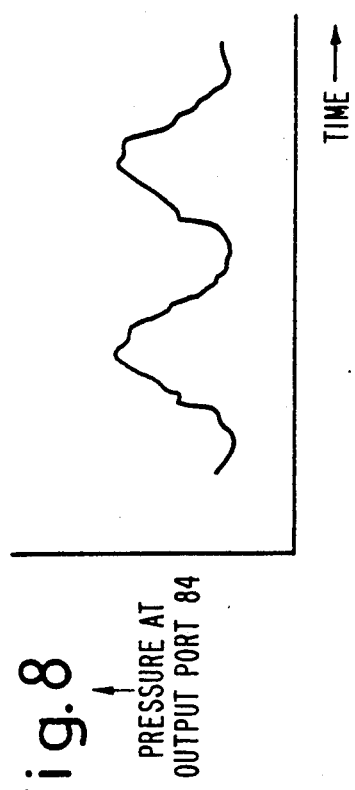
Figure 10A:
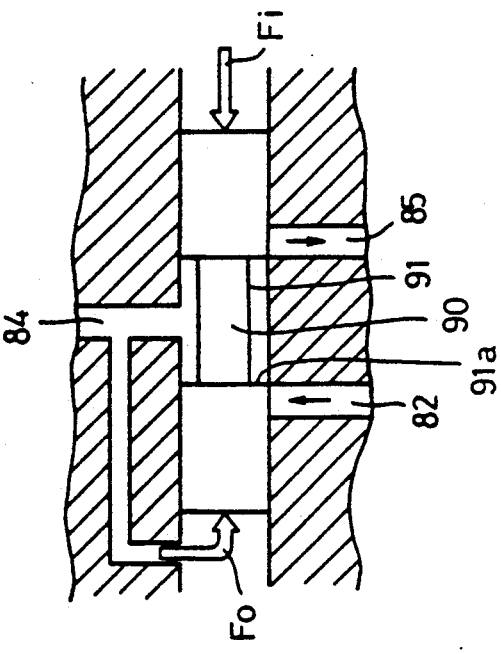
FIG. 10a is a longitudinal section of a pressure control valve of a prior art.

The spool 90 has conical surfaces 91a at both ends of the annular groove 91. The conical surfaces 91a slant from annular outer surfaces of lands adjacent the groove 91 toward the bottom of the groove 91 with an angle under a right angle with respect to the longitudinal axis of the spool 90. The conical surfaces 91a prevent sharp fluctuations of the pressure at the output port 84. For example, when the spool 90 moves in left direction to increase the pressure of the output port 84, the groove 91 at first communicates with the line pressure port 82 through a small space on a conical surface 91a. Thus the pressure at the output port 84 increases gradually with respect to the movement in left direction of the spool 90. This gradual increasement of the pressure has no pressure impulse. Namely the pressure control valve 80fr provides the suspension 100fr with smooth change of the pressure as shown in FIG. 8 when the current level of the electric coil 99 changes in a form of a sine wave. The change of the pressure shown in FIG. 8 has not the sharp fluctuations (higher harmonics) as shown in FIG. 10b.

Figure 4:
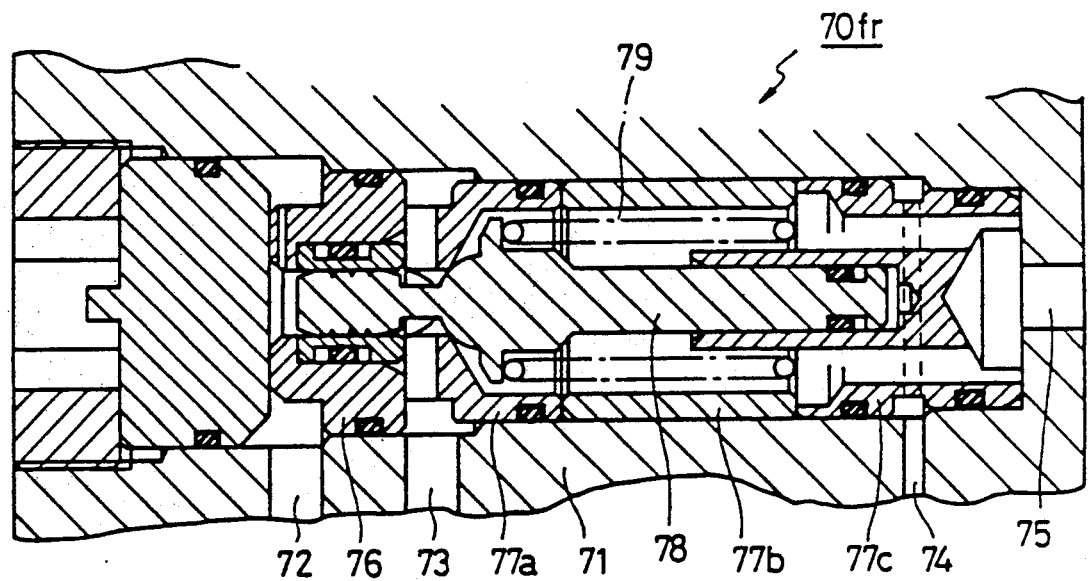

FIG. 4 shows a longitudinal section of the cut valve 70fr to an enlarged scale. It includes a valve body 71 formed with a valve receiving bore which communicates with a line pressure port 72, a regulation input port 73, a drain port 74 and an output port 75. An annular first guide 76 provides a partition between the ports 72 and 73, and three cylindrical guides 77a, 77b and 77c provide a partition between the ports 73 and 75. The drain port 74 communicates with an annular groove formed in the outer periphery of the second guide 77c, thus returning any oil which leaks to the outer periphery of these second guides 77a to 77c to the return path 11.

A line pressure is applied to the left end of a spool 78 which extends through the first and the second guide 76, 77a to 77c and which is urged to the left by a coiled compression spring 79. A guide hole formed in a central plateau of the second guide 77c in which the right end of the spool 78 is disposed communicates with the return path 11 through an annular groove formed in the outer periphery of this guide and through the drain hole 74. When the line pressure is below a given low value, the spool 78 is driven to its leftmost position under the resilience of the spring 79, whereby a communication between the ports 75 and 73 is interrupted as a result of the spool 78 fully closing the internal opening of the second guide 77a. When the line pressure becomes equal to or greater than the given value, such pressure is effective to begin driving the spool 78 to the right against the resilience of the spring 79, and the spool 78 reaches to its rightmost position where it is fully open at a particular pressure above the given low pressure. Thus, the spool 78 moves past the inner opening in the second guide 77a to the right thereof, whereby a communication is established between the ports 73 and 75, and when the line pressure from the port 72 rises to the given low pressure, the cut valve 70fr begins establishing a communication between the port 73 (the regulated pressure output from the pressure control valve 80fr) and the output port 75 (shock absorber 101fr). As the line pressure from the port 72 further increases, a full communication is established between the ports 73 and 75. As the line pressure decreases, the procedure is opposite to that mentioned above, and when the line pressure decreases below the given low pressure, the output port 75 or the shock absorber 101fr is completely cut off from the regulating input port 73 or the regulated output from the pressure control valve 80fr.

Figure 5:
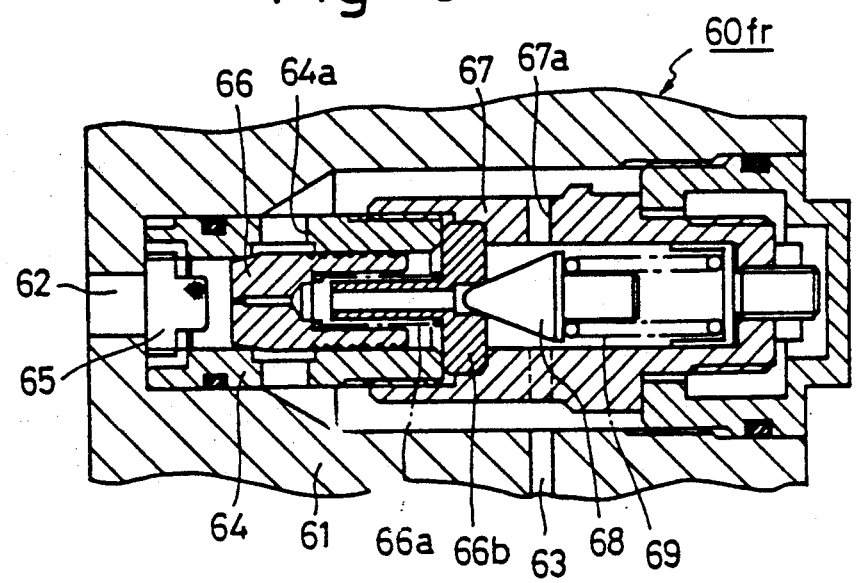

FIG. 5 shows the relief valve 60fr in an enlarged longitudinal section. It includes a valve body 61 formed with a valve receiving bore, into which an input port 62 and a low pressure port 63 open. The valve receiving opening receives a first guide 64 and a second guide 67, both of which are cylindrical in configuration, and the input port 62 communicates with the inner space of the first guide 64 through a filter 65. A valve element 66 having a centrally disposed orifice is inserted into the first guide 64, and the valve element 66 is urged to the left by a coiled compression spring 66a. The space in the first guide 64 in which the valve element 66 and the spring 66a are received communicates with the input port 62 through the orifice in the valve element 66, and also communicates with the internal space of the second guide 67 through an opening formed in a spring abutment 66b. A conical valve element 68 is urged to the left by a coiled compression spring 69 to close the opening in the spring abutment 66b. When a control pressure from the input port 62 is below a given high pressure, a space in which the spring 66a is received and which communicates with the input port 62 through the orifice in the valve element 66 assumes a pressure which is less in magnitude than the resilience of the spring 69, whereby the valve element 68 closes the central opening in the valve seat 66b, as shown in FIG. 5. Thus, the output port 62 is cut off from the internal space of the second guide 67 which communicates with the low pressure port 63 through an opening 67a. Thus, the output port 62 is cut off from the low pressure port 63.

When the control pressure to the input port 62 rises to the given high pressure, the pressure which is applied to the central opening in the valve seat 66b through the orifice in the valve element 66 is effective to initiate driving the valve element 68 to the right, and when the pressure from the port 62 further increases, the valve element 68 will be driven to its rightmost position, where the pressure from the input port 62 will be discharged into the low pressure port 63, thus suppressing the control pressure around or less than the given high pressure.

When a high pressure surge is applied to the input port 62, the valve element 66 is driven to the right, whereby the input port 62 communicates with the space in the body 61 which receives the valve through a lateral opening 64a formed in the first guide 64 and thence to the low pressure port 63 having an increased channel area, thus providing a buffering action upon a rapid pressure surge applied from the input port 62.

Figure 6:
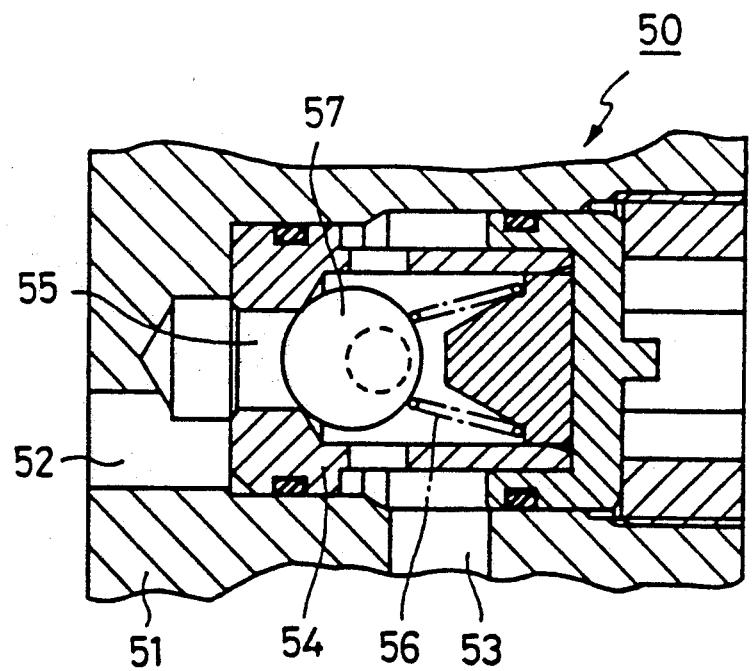

FIG. 6 is an enlarged longitudinal section of the main check valve 50. It includes a valve body 51 formed with a valve receiving bore, which communicates with an input port 52 and an output port 53. A cylindrical valve seat 54 having a closed bottom is received in the bore, and is formed with a channel opening 55, which is usually closed by a ball valve 57 as urged by a coiled compression spring 56. However, when the pressure of the input port 52 is higher than the pressure of the output port 53, the ball valve 57 is pushed back to the right by the pressure from the input port 52, thus opening the channel opening 55 to allow an oil flow in a direction from the input port 52 to the output port 53. However, when the output port 53 assumes a pressure greater than that of the input port 52, the channel opening is closed by the ball valve 57, thus blocking a reverse oil flow.

Figure 7:
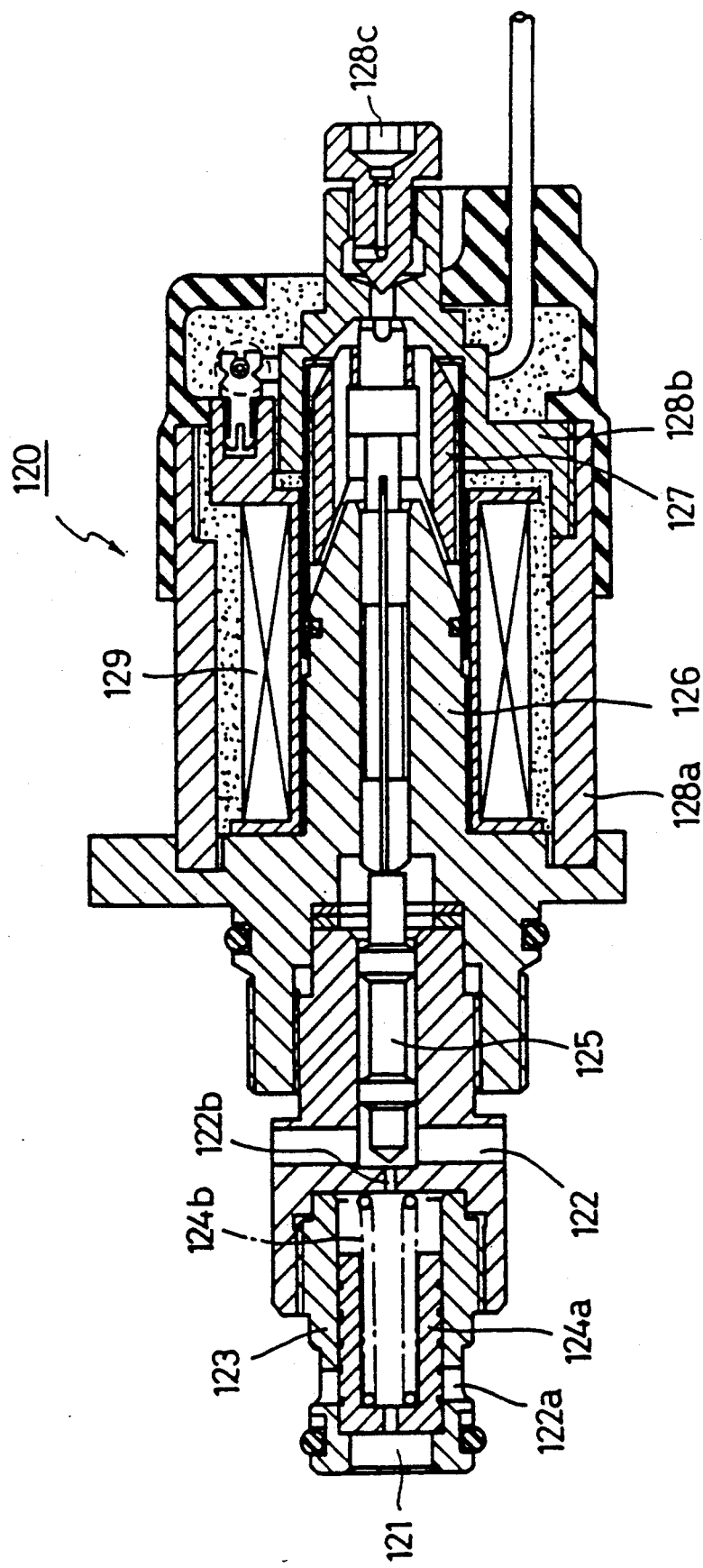
FIG. 7 is a longitudinal section, to an enlarged scale, of a bypass valve 120 shown in FIG. 1b.

FIG. 7 shows a bypass valve 120 in an enlarged longitudinal section. It includes a input port 121 which communicates with the internal space of a first guide 123, in which a valve element 124a is received and is normally urged to the left by a coiled compression spring 124b. The valve element 124a is centrally formed with an orifice in its left end face, through which the input port 121 communicates with the internal space of the first guide 123. This space communicates with a low pressure port 122 through a channel 122b, which is open or closed by a needle valve 125.

Solenoid assembly comprising components including the needle valve 125 and an electrical coil 129 has the same construction and the same size as the solenoid assembly shown in FIG. 3 including the needle valve 95 and the electrical coil 99 so as to be used in common for the pressure control valve and the bypass valve. It is designed so that the spacing of the needle valve 125 from the orifice 122b is substantially in inverse proportion to the current level which passes through the coil 129. The channel opening which the orifice 122b exhibits is in inverse proportion to the spacing, and hence the flow rate of the oil which passes from the input port 121 through the orifice of the valve element 124a, the internal space of the first guide 123 and through the orifice 122b to the low pressure port 112 is proportional to the pressure differential across the orifice formed in the left end face of the valve element 124a.

As a consequence, the pressure of the input port 121 will be substantially proportional to the current level which passes through the coil 129. The bypass valve 120 operates to provide a line pressure at the input port 121 which is proportional to the current level in a given range. When an ignition switch is off and accordingly the engine as well as the pump 1 cease to operate, the coil 129 is deenergized, whereby the needle valve 125 moves to its rightmost position, and the input port 121 or its line pressure assumes a low value which is near the return pressure.

When a high pressure surge is applied to the input port 121, the valve element 124a is driven to the right, whereby the low pressure port 122a communicating with the low pressure port 122 communicates with the input port 121. Since the low pressure port 122a has a relatively large opening, the pressure surge applied to the input port 121 is immediately discharged through the low pressure port 122a.

The relief valve 60m is constructed in the same manner as the relief valve 60fr mentioned above, but employs a coiled compression spring (69) having slightly less resilience for urging a conical valve element (68 shown in FIG. 5). Accordingly, an output port (62) is cut off from a low pressure port (63) when a pressure from an input port (62) or a pressure at the high pressure port 3 is below a given high pressure which is slightly less than a pressure at which the relief valve 60fr discharges the pressure at its input port 62 to the low pressure port 63. When the input port (62) assumes a pressure which is equal to or greater than the given high pressure, a valve element (68) is driven to its rightmost position. In this manner, the pressure from the input port (62) is discharged to the low pressure port (63), thus suppressing the pressure at the high pressure port 3 at or below the given high pressure.

In the apparatus for supporting a carrosserie as shown in FIGS. 1a and 1b, the main check valve 50 supplies oil from the high pressure port 3 to the high pressure piping 8, but blocks a reverse flow from the piping 8 to the port 3. The relief valve 60m suppresses the pressure at the high pressure port 3 or the high pressure piping 8 at or below a given high pressure, and in the event a high pressure surge is applied to the port 3, it releases such surge to the return path 11, thus buffering the transmission of a pressure surge to the piping 8.

The bypass valve 120 controls the pressure of the rear wheel high pressure feed piping 9 substantially linearly in a given range, and maintains the pressure of the piping 9 at a given value during a steady-state operation. The constant pressure control takes place by controlling the current level of the bypass valve 120 with reference to a pressure detected by the pressure sensor 13rm. In the event a high pressure surge is applied to the rear wheel suspension, the valve releases it to the return path 11, thus buffering its transmission to the piping 8. When the ignition switch is open, and the engine as well as the pump 1 cease to operate, the energization is interrupted, whereby the piping 9 is made to communicate with the return path 11, thus decompressing.

Pressure control valves 80fr, 80fL, 80rr, 80rL deliver the required sustain pressure to output ports (84) by controlling the current level of the electrical coil (99) so that the required sustain pressure is applied to the suspension through the suspension pressure control. The transmission of a pressure surge to the suspension is buffered, thus suppressing a hunting of the pressure controlling spool (90), thus allowing the pressure applied to the suspension to be stabilized.

Cut valves 70fr, 70fL, 70rr and 70rL interrupt the suspension pressure feeding line between the output port 84 of the pressure control valve and the suspension to prevent the pressure from being released from the suspension when the line pressure (front wheel high pressure feed piping 6 or the rear wheel high pressure feed piping 9) is below a given low pressure, and fully opens the feed line whenever the line pressure is equal to or greater than the given low pressure. In this manner, the suspension pressure is automatically prevented from going abnormally low value when the line pressure is low.

Relief valves 60fr, 60fL, 60rr, 60rL limit the pressure of the suspension feed line between the output port 84 of the pressure control valve and the suspension or principally the suspension pressure to less than an upper limit so that any high pressure surge applied to the feed line or the suspension as when the vehicle is bumped or a load of high mass is thrown onto the vehicle may be released to the return path, thus buffering the impact upon the suspension and enhancing the durability of the feed line and its connected mechanical elements.

A SECOND EMBODIMENT

Figure 9A:
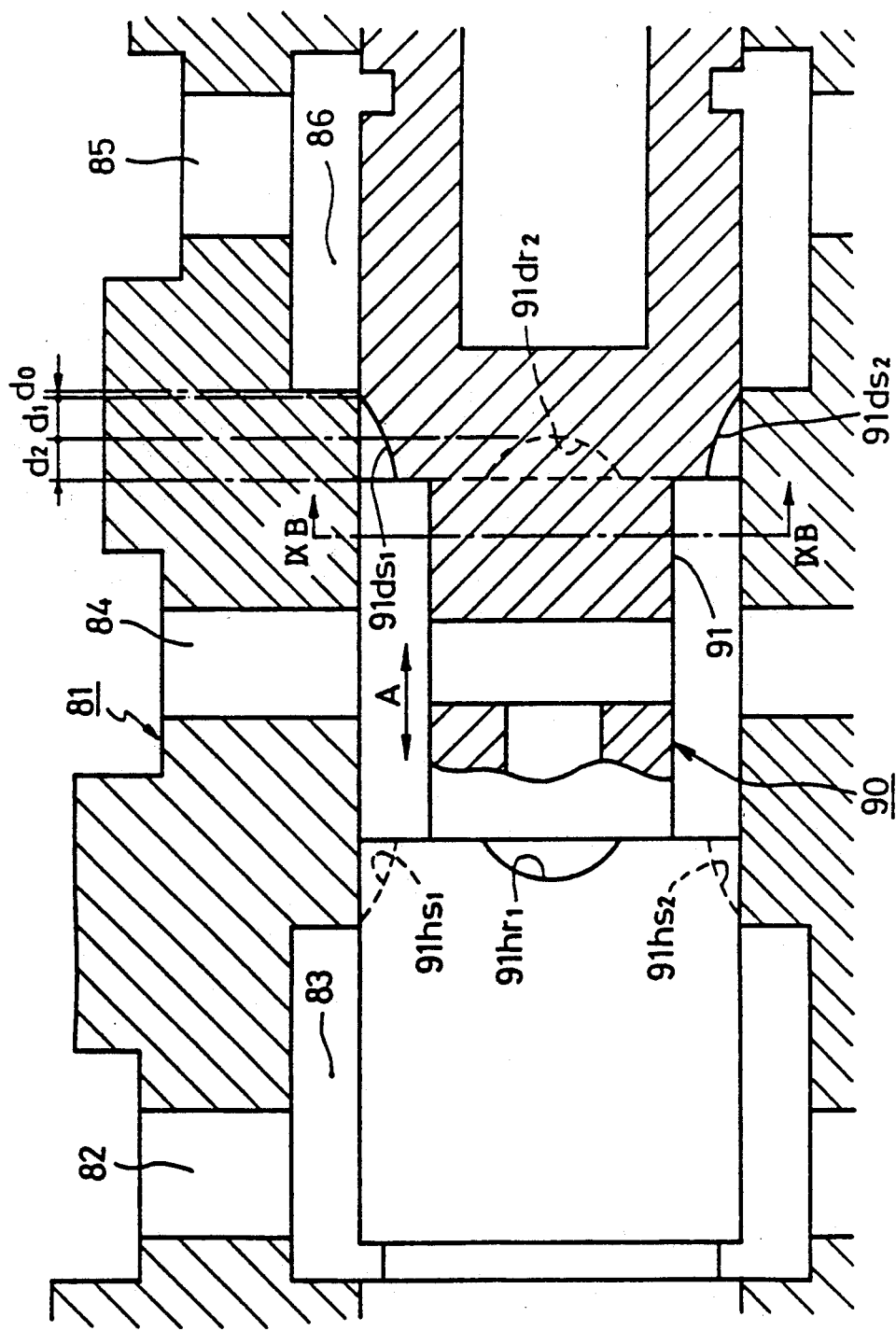
FIG. 9a is a longitudinal section, to an enlarged scale, of a part of a pressure control valve of the second embodiment.
Figure 9B:
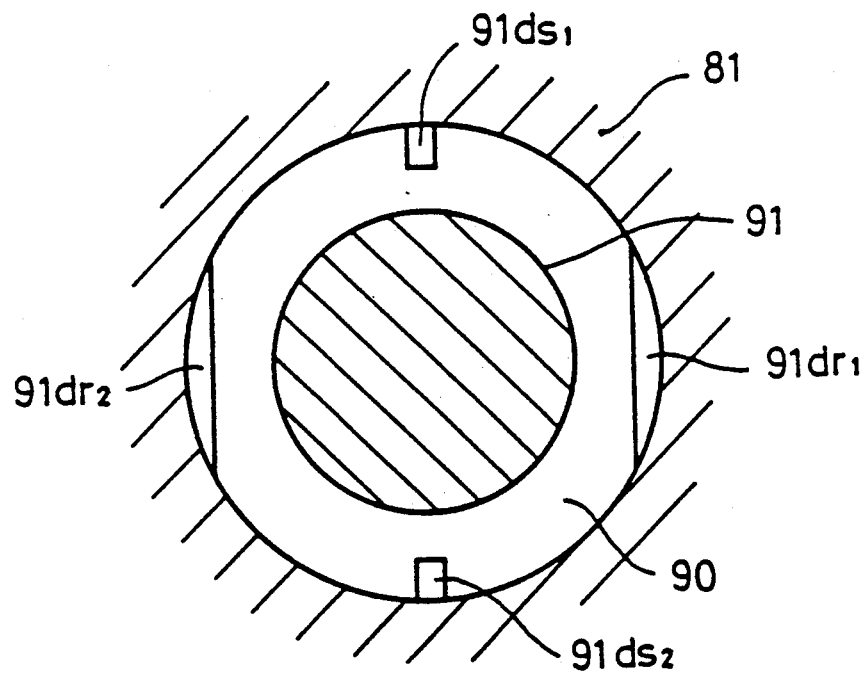

FIGS. 9a and 9b show a longitudinal section of a pressure control valve of a second embodiment of the invention. A pair of slitted grooves 91$ds_1$, 91$ds_2$ each having a curvedly tapered bottom inclined to left and a pair of bezels 91$dr_1$, 91$dr_2$ inclined to left are formed at an edge of a right side land adjacent to the groove 90. The slitted grooves 91$ds_1$, 91$ds_2$ and the bezels 91$dr_1$, 91$dr_2$ extend from an outer annular surface of the right side land to the groove 90. Also a pair of slitted grooves 91$hs_1$, 91$hs_2$ each having a curvedly tapered bottom inclined to right and a pair of bezels 91$hr_1$, 91$hr_2$ inclined to right are formed at an edge of a left side land adjacent to the groove 90. The slitted grooves 91$hs_1$, 91$hs_2$ and the bezels 91$hr_1$, 91$hr_2$ extend from an outer annular surface of the left side land to the groove 90. The other parts or elements of the valve shown in FIG. 9a are same with that of the valve 80fr shown in FIG. 3.

Each length $d_1+d_2$ of the slitted grooves 91$ds_1$, 91$ds_2$, 91$hs_1$, 91$hs_2$ along driving direction (in the direction shown by an arrow A in FIG. 9a) of the spool 90 is predetermined as shown in FIG. 9a, in which the spool 90 is at an intermediate or neutral position. The length $d_1+d_2$ is long enough to communicate the groove 91 to the low pressure groove 86 or the line pressure groove 83 when the spool 90 moves slightly over the very little distance $d_O$. As compared with this, each length $d_2$ of the bezels 91$dr_1$, 91$dr_2$, 91$hr_1$, 91$hr_2$ is considerably shorter than the length 941 $d_1+d_2$ of the slitted grooves 91$ds_1$, 91$ds_2$, 91$hs_1$, 91$hs_2$.

Therefore during an initial term of the movement of the spool 90 from the neutral position shown in FIG. 9a within a distance $d_O+d_1+d_2$, the groove 91 communicates with the low pressure groove 86 or the line pressure groove 83 only through the slitted grooves 91$ds_1$, 91$ds_2$ or 91$hs_1$, 91$hs_2$ in a first half term in which the spool 90 moves within a distance $d_O+d_1$ then the groove 91 communicates with the low pressure groove 86 of the line pressure groove 83 through the slitted grooves 91$ds_1$, 91$ds_2$ or 91$hs_1$, 91$hs_2$ and the bezels 91$dr_1$, 91$dr_2$ or 91$hr_1$, 91$hr_2$ in a second half term in which the spool 90 moves over the distance $d_O+d_1$ and within the distance $d_O+d_1+d_2$. After the second half term namely after the movement of the distance $d_O+d_1+d_2$, the spool 90 communicates directly with the low pressure groove 86 or line pressure groove 83.

Figure 9C:
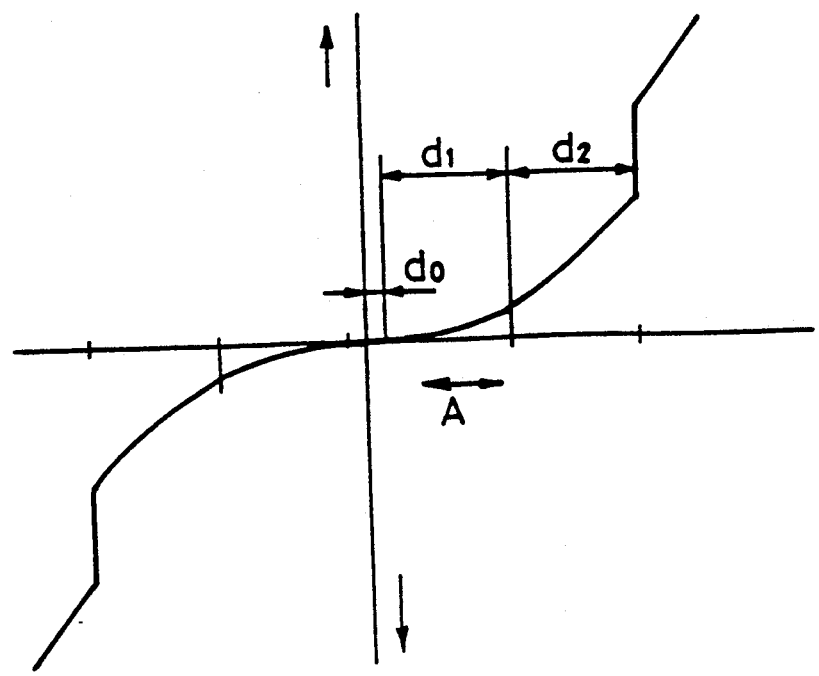

FIG. 9c shows a cross sectional area of a communication pass from the groove 90 to the low pressure groove 86 or to the line pressure groove 83 depending on the position of the spool 90. As shown in FIG. 9c, the cross sectional area of the communication pass increases in a form of a curved correlation with respect to the position of the spool 90 within the distance $d_O+d_1+d_2$. Consequently, when the spool 90 moves to right or left, the pressure in the groove 91 falls or rises with a small inclination in the first half term up to the distance $d_O+d_1$, then with a larger inclination in the second half term up to the distance $d_O+d_1+d_2$, and thereafter with a largest inclination over the distance $d_O+d_1+d_2$. Specifically the small inclination in the first half term contributes not to generate sharp fluctuations of the pressure in the groove 91 which may cause an oscillation of the spool 90. Thus the sharp fluctuations (higher harmonics) as shown in FIG. 10b are not appeared at the output port 84 shown in FIG. 9a.

The curved correlation characteristic shown in FIG. 9c may be modified by a design choice of a configuration, length and/or inclination of one or more of the slitted grooves 91$ds_1$, 91$ds_2$, 91$hs_1$, 91$hs_2$ and the bezels 91$dr_1$, 91$dr_2$, 91$hr_1$, 91$hr_2$.

While preferred embodiments of the invention have been illustrated and described, it is to be understood that there is no intention to limit the invention to the precise constructions herein disclosed and the right is reserved to all changes and modifications coming within the scope of the invention as defined in the appended claims.

What we claim is:

1. A pressure control valve device comprising:
a spool support member having a high pressure port, an outlet port and a low pressure port, each of said ports arranged along a longitudinal axis of the spool support member, said outlet port being positioned between said high pressure port and said low pressure port;
a spool disposed within the spool support member for movement along the longitudinal axis, the spool having a first land, a second land and a fluid communication groove formed between the first and the second lands and in continuous communication with the outlet port, said spool being moved by a pressure applied to an end of the spool from the outlet port to decrease a flow rate from the high pressure port to the outlet port through the groove and to increase the flow rate from the outlet port to the low pressure port through the groove;
actuator means for driving the spool in a first direction to increase the flow rate from the high pressure port to the outlet port and to decrease the flow rate from the outlet port to the low pressure port;
an electrical driver for driving the actuator means in the first direction;
a first group of inclined surfaces provided on the first land of the spool, the inclined surfaces being inclined from an annular surface of the first land to the groove so as to slow a change of the flow rate from the outlet port to the low pressure port due to movement of the spool in the first direction; a first length along the longitudinal axis of the spool corresponding to at least one of the first group of inclined surfaces being greater than a second length corresponding to remaining ones of the first group of inclined surfaces; the first length being shorter than a length extending from an edge of the groove at the first land to the low pressure port when the spool is at an intermediate position;
a second group of inclined surfaces provided on the second land of the spool, the inclined surfaces being inclined from an annular surface of the second land to the groove so as to slow a change of the flow rate from the high pressure port to the outlet port due to movement of the spool in a second direction opposite to the first direction; a third length along the longitudinal axis of the spool corresponding to at least one of the second group of inclined surfaces being greater than a fourth length corresponding to remaining ones of the second group of inclined surfaces; the third length being shorter than a length extending from an edge of the groove at the second land to the high pressure port when the spool is at an intermediate position; and the second group of inclined surfaces facing the first group of inclined surfaces in a direction along the longitudinal axis of the spool such that the surfaces of the third length of the second group face the surfaces of first length of the first group and the surfaces of the fourth length of the second group face the surfaces of the second length of the first group.

2. A pressure control valve device as claimed in claim 1, wherein the surfaces of the first and third lengths of the first and the second gorups are slitted grooves each having a tapered bottom inclined from the annular surfaces of the lands toward the bottom of the groove, and the surfaces of the second and fourth lengths of the first and the second groups are bezels slanting from the annular surfaces of the lands toward the bottom of the groove.

* * * * *

UNITED STATES PATENT AND TRADEMARK OFFICE
CERTIFICATE OF CORRECTION

PATENT NO. : 5,031,663

DATED : July 16, 1991

INVENTOR(S) : Fukuta et al

It is certified that error appears in the above-identified patent and that said Letters Patent is hereby corrected as shown below:

On the title page, item [21], Appl. No. "503,362" should read --503,627--.

Signed and Sealed this

Eighth Day of December, 1992

Attest:

DOUGLAS B. COMER

*Attesting Officer*     Acting Commissioner of Patents and Trademarks